2,995,604
Patented Aug. 8, 1961

2,995,604
RECOVERY OF N,N-DIETHYLTOLUAMIDE
William L. Phalen, Jr., St. Simons Island, Ga., assignor to Hercules Powder Company, Wilmington, Del., a corporation of Delaware
No Drawing. Filed Dec. 10, 1958, Ser. No. 779,291
7 Claims. (Cl. 260—558)

This invention relates to a process for the preparation of N,N-diethyltoluamides and more particularly to the preparation of N,N-diethyl-m-toluamide.

It has recently been established that N,N-diethyl-m-toluamide is a very effective insect repellent. The compound itself has been known for a number of years, and its preparation by reaction of diethylamine with the acid chloride of m-toluic acid is recorded in the literature. It has recently been found that N,N-diethyltoluamides may be produced in high yield and with high conversion, and with minimum formation of color and odor bodies and other by-products, through utilization of a continuous vapor phase process involving a selective catalyst which may be either silica gel or alumina. This process is more fully described and claimed in the copending application of Romeo B. Wagner, Serial No. 705,797, filed December 30, 1957, now Patent No. 2,932,665. The process involves continuously introducing diethylamine and toluic acid, in a molar ratio of amine to acid which is between about 2:1 and about 6:1, into a reaction zone containing one of the aforementioned catalysts, and passing the amine and acid in intimate contact with each other over the catalyst at a rate which corresponds to a contact time of up to about 2 minutes the temperature being in the range of 250° to 350° C. The amide is continuously removed in the vapor state from the reaction zone and is condensed.

The amide recovered from the above process is, of course, a crude material which must be further processed to obtain an acceptable product. Unreacted diethylamine and toluic acid have to be removed, and the remaining amide has to be fractionally distilled to separate minor impurities such as N-monoethyltoluamide. The diethylamine may be removed by distillation or by extraction with sulfuric acid, and then the toluic acid by caustic extraction. When distillation is used for amine removal, provision also must be made for recovery of the amine which is present in the form of its salt with toluic acid, and this may be accomplished by sparging the crude amide with, for example, benzene or toluene. Such a recovery system is obviously cumbersome and expensive.

The present invention represents an improvement in the process of preparing N,N-diethyltoluamide by the steps comprising (1) continuous vapor phase reaction between diethylamine and toluic acid in a molar ratio of amine to acid which is between about 2:1 and about 6:1 at 250° C. to 350° C. in a reaction zone containing a catalyst selected from the group consisting of silica gel and alumina (2) continuous removal of vaporized crude amide from said reaction zone (3) condensation of the crude amide and (4) recovery of purified amide by fractional distillation. The improvement in this overall process comprises the steps of separating from the vaporized crude amide the bulk of the free and unreacted diethylamine during condensation step (3), and removing from the condensed crude amide prior to distillation thereof the diethylamine and toluic acid which are combined as diethylammonium toluate by subjecting the condensed crude amide to extraction with water.

The water extraction step will remove from the crude amide all unreacted toluic acid which is in the form of the salt, diethylammonium toluate, and to insure that all the acid is in the form of the salt, a small amount of diethylamine in the crude amide is desired. However, the water extraction is not a method for removing all diethylamine from the crude amide, the amine having been found to distribute itself fairly equally between the organic and aqueous phases resulting from the extraction. As a consequence, the bulk of the unreacted amine should be removed from the crude amide during condensation of the effluent from the vapor phase amidation reactor. An even more important reason for this prior removal will appear hereinafter.

The process of this invention is more particularly set forth in the following specific examples. All parts and percentages in this specification and claims are by weight unless otherwise noted. The following terms are defined for a better understanding of the examples:

(1) Percent reacted equals the quantity of reactant used up chemically divided by the quantity of reactant charged and multiplied by 100.

(2) Percent reaction conversion equals the quantity of product formed divided by the theoretical quantity of product expected from the quantity of reactant charged multiplied by 100.

(3) Percent process conversion equals the quantity of product recovered divided by the theoretical quantity of the product expected from the quantity of reactant charged multiplied by 100.

(4) Percent reaction yield equals the quantity of product formed divided by the theoretical quantity of product expected from the quantity of reactant used up chemically multiplied by 100.

(5) Percent process yield equals the quantity of product recovered divided by the theoretical quantity of product expected from the quantity of reactant used up chemically multiplied by 100.

(6) Contact time equals the millimoles of perfect gas which occupies the empty reactor volume divided by the millimoles/minute of reactants fed to the reactor. It also may be defined as the time the reactants reside in the zone of the catalyst bed, assuming the catalyst occupies no volume, and may be represented by the equation $$C_T = \frac{VTP}{1.315\,MO}$$

where $C_T$=contact time in minutes, $V$=volume of catalytic zone in cubic feet, $T$=time in minutes, $P$=pressure in atmospheres, $M$=pound-moles of reactants, and $O$=temperature in degrees Kelvin.

*Example 1*

This run was carried out in a stainless steel reactor 24 inches in length and having an internal diameter of 6 inches. Its full length was packed with silica gel, mesh size 10. The reactor was fitted with the necessary thermocouples and heating means and was designed for downflow and for feeding the diethylamine and toluic acid separately or combined. The feed material was fed to the reactor from a feed drum through a rotameter and a preheater. The reaction effluent after passing through a condenser was collected in stainless steel product receiving tanks.

The procedure utilized was to pass hot feed material through the reactor during the time needed to bring it up to a temperature of 305° C. When this temperature level was reached, the measured run was started. The feed material was diethylammonium toluate in solution in diethylamine, and the toluic acid used in preparation of the diethylamine salt was a mixture of toluic acids constituting approximately 95% meta and 5% para. The molar ratio of diethylamine to toluic acid was 2.07. The diethylammonium toluate was fed to the reactor at such a rate as to provide a contact time of 0.98 minute.

During this run the condenser was operated under partial condensation to permit removal of most of the diethylamine as vapor from the rest of the reaction product mixture and to condense the latter. Analysis of the condensate showed that on a toluic acid basis there had been 78.4% reacted, 71.3% reaction conversion, 70.1% process conversion, 90.9% reaction yield and 89.3% process yield. Further analysis established that the condensate contained 78% of the desired amide, 18.1% diethylammonium toluate, 2.9% diethylamine and about 2% water.

A 100-gram sample of the condensate was dissolved in 50 ml. of benzene, resulting in a solution having a weight of 141 grams. This solution then was shaken vigorously with 100 ml. of distilled water and the phases then permitted to separate. Upon analysis the organic phase was found to contain 1.31% diethylamine and 0.43% diethylammonium toluate. Similar analysis of the aqueous phase showed the presence of 1.18% diethylamine and 14.21% diethylammonium toluate. Based on the weight of the original benzene solution of the condensate, calculation shows that the separated organic phase contained 0.606 gram of diethylammonium toluate, thereby representing 0.394 gram of toluic acid. These data establish that the diethylamine distributes between the organic and aqueous phases in a ratio of about 1:1 and that more than 95% of the diethylammonium toluate was removed by one water wash extraction.

*Example 2*

Using the same crude amide condensate as utilized in Example 1, the extraction with water was carried out in two steps. A 100-gram sample of the condensate was again utilized, and it was dissolved in 70 ml. of benzene. The resulting solution then was extracted with 100 ml. of distilled water and upon separation of the aqueous and organic phases, both were subjected to analysis. The organic phase was then again extracted with 100 ml. of distilled water and the separated phases again analyzed.

It was found that the aqueous phase from the first extraction weighed 117 grams and contained 1.07% diethylamine and 14.4% diethylammonium toluate. The aqueous phase from the second extraction amounted to 103 grams and contained 0.34% diethylamine and 0.67% diethylammonium toluate. Similarly, the organic phase from the first extraction was found to contain 1.25% diethylamine and 0.37% diethylammonium toluate. After the second extraction, the organic phase, which now amounted to 113 grams, analyzed for 0.85% diethylamine and 0% diethylammonium toluate. These data show that two separate batch extractions with water of the crude amide condensate essentially remove all of the diethylammonium toluate from the organic phase.

*Example 3*

The amidation reaction of Example 1 was repeated except to use diethylamine and toluic acid in a molar ratio of 5.04 at a contact time of 0.84 minute and at a reaction temperature of 246° C. The condenser was operated under partial condensation to permit substantial removal of free diethylamine, water and other low boilers, and the condensed reaction product mixture upon analysis showed that the reaction had been run with 92.4% reacted, 84.1% reaction conversion, 81.8% process conversion, 90.9% reaction yield and 88.4% process yield.

The crude amide condensate analyzed for 4.1% diethylamine, 5.9% diethylammonium toluate, 79% diethyltoluamide and 0.5% water. To a 1,000-gram sample of this condensate was added 500 ml. of benzene and the resulting solution was extracted with 250 ml. of distilled water. Upon separation of the phases, the aqueous phase was extracted with 200 ml. of benzene and the benzene layer from this extraction was combined with the organic layer from the first extraction. The combined organic material then was twice more extracted with 250 ml. portions of distilled water and the aqueous phases from these extractions were backwashed with additional quantities of benzene, 200 ml. in the first instance and 100 ml. in the second. Utilizing this technique, it was found that complete separation of diethylammonium toluate had been effected from the original crude amide condensate.

The total organic material recovered from the various extractions was subjected to fractional distillation. There was recovered 771 grams of N,N-diethyltoluamide.

*Example 4*

Following the general procedure and conditions of Example 1, the reaction between diethylamine and toluic acid was carried out at a temperature of 285° C., a contact time of 0.35 minute and at a feed rate corresponding to 8.2 pounds per hour. The feed material was diethylammonium toluate dissolved in diethylamine, and the ratio of diethylamine to toluic acid was 5.22. By carrying out the reaction in this manner 92.7±0.3% diethylammonium toluate reacted. On the basis of the diethylammonium toluate utilized, the process conversion was 87.5%, the reaction conversion was 90.4%, the process yield was 94.3% and the reaction yield was 97.4%.

The crude amide from the above reaction was subjected to continuous water extraction to remove diethylammonium toluate. The extraction was carried out in a column 6 feet in length with an internal diameter of 3 inches and packed with one-half inch porcelain saddles. The packed height of the column was 60 inches, and there was a 12-inch settling zone at the top. Water was fed to the top of the column, toluene to the bottom and crude amide diluted with some toluene to the center. Four hundred pounds of the crude amide were so extracted, this amide analyzing for 6.2% diethylammonium toluate, 4.2% diethylamine, 82% diethyltoluamide and 0.8% water. The column was initially fed water at a rate of 125 ml. per minute, toluene at a rate of 102 ml. per minute and crude amide at a rate of 133 ml. per minute. The aqueous and organic phases from the column were analyzed, and at the feed rates aforementioned, there was collected a total aqueous phase amounting to 69 pounds and a total organic phase amounting to 112.5 pounds. The aqueous phase was found to contain 5.3% diethylammonium toluate, 1.4% diethylamine and 0.3% diethyltoluamide. The corresponding organic phase contained 0.36% diethylammonium toluate, 2% diethylamine, 51% diethyltoluamide, 1.9% water and 42% toluene.

The feed rates then were changed to correspond to 69 ml. of water per minute, 102 ml. of toluene per minutes and 135 ml. of crude amide per minutes. The resulting aqueous phase amounted to 39.5 pounds and the organic phase, 113.25 pounds. The aqueous phase analyzed for 10.1% diethylammonium toluate, 1.5% diethylamine and .7% diethyltoluamide. The organic phase contained .28% diethylammonium toluate, 1.9% diethylamine, 50% diethyltoluamide, 1.8% water and 40% toluene.

The feed rate then was changed to 29 ml. of water per minute, 102 ml. of toluene per minutes and 133 ml. of crude amide per minute. The aqueous phase covered amounted to 11.5 pounds and the organic phase, 55.75 pounds. In the aqueous phase there was 14.9% diethylammonium toluate, 1.3% diethylamine and 2.3% diethyltoluamide. The organic phase contained .61% diethylammonium toluate, 2.4% diethylamine, 54% diethyltoluamide, 2.24% water and 29% toluene.

It is apparent from the above data that diethylammonium toluate can be continuously extracted from the crude amide in a packed column. Although this particular column was not as efficient as it could have been, it was possible to obtain as low as 0.2% diethylammonium toluate in the organic phase and as low as 0.3% diethyltoluamide in the aqueous phase.

The amides utilized by the examples were obtained through reaction of diethylamine with a mixture of toluic acids which was approximately 95% meta and 5% para. However, those diethyltoluamides prepared from other mixtures of the isomeric toluic acids also may be utilized; for example, ortho-meta, ortho-para and ortho-meta-para and the relative amounts of the isomers may be widely varied. Furthermore, the diethylamide of any one particular toluic acid isomer may be used. It is desirable from the standpoint of the insect repellency of the product to have as high as concentration of the meta-isomer as possible. Preferable mixtures are those wherein the meta to para ratio is above 80:20, more desirably above 85:15. Even more effective is the product obtained from the mixture of toluic acids utilized in the examples.

Prior to the process of this invention it was necessary to remove the diethylamine from the crude amide product either by distillation or by extraction with sulfuric acid, and in either event, it was necessary subsequently to remove toluic acid by extraction with an aqueous alkali, such as aqueous sodium hydroxide. This step of removing toluic acid by extraction with aqueous alkali has many disadvantages. When aqueous sodium hydroxide, for example, is used, the extraction results in formation of a solution of sodium toluate in water, and this solution constitutes an aqueous phase which is in contact with an organic phase containing the crude amide and, usually, a solvent such as benzene or toluene. It was found that the concentration of sodium toluate in the aqueous phase could not exceed 45–50%, else formation of solid phase sodium toluate would occur. This obviously also placed a limitation on the amount or concentration, or both, of the aqueous sodium hydroxide used. Furthermore, increasing concentrations of sodium hydroxide resulted in considerable loss of amide to the aqueous phase, and this effect was further accentuated by the presence of comparatively small amounts of diethylamine in the crude amide fed to the extraction. Finally, the aqueous alkali extraction technique for removal of toluic acid necessitated neutralization of the sodium toluate (or related metal toluate) with an acid, such as sulfuric acid, and recovery of the toluic acid before the latter could be recycled to the amidation reaction.

By comparison, the process of this invention, involving removal of the toluic acid by virtue of the water solubility of its salt with diethylamine, is a much more simple procedure having unforeseen advantages. Actually, the invention is based upon the discovery of the water solubility of diethylammonium toluate, but it was additionally found that water solutions of this salt would not give a solid salt phase, the salt being miscible in all proportions with water, and would not detract from product yield by solubilizing diethyltoluamide. In the process of this invention the distribution of the amide between phases is much more in favor of the organic phase than is the case where extraction with aqueous alkali is used. It was further discovered that the amount of unreacted diethylamine in the crude amide was not nearly as critical as it had been in the caustic extraction procedure and that the effect was different. In the process of this invention, too much of the amine in the amide results in an increased concentration of diethylammonium toluate in the organic phase, but the amount of amine which can be tolerated in the present process before an adverse effect is obtained is considerably more than in the case of caustic extraction.

Nevertheless, it is true that it is necessary to control the amount of free and unreacted amine in the crude amide fed to the extraction system, and this is accomplished by operating the condensation system of step (3) in the overall process so as to separate the bulk of the amine from the vaporized crude amide. This can be done by running the condenser at a temperature which will condense the amide but permit the diethylamine to remain as a vapor. Temperatures between 60° and 110° C. are satisfactory. The condensed crude amide should contain no more than about 10% of free amine by weight, and smaller amounts are preferred, for example, about 6% or less. Although complete removal of amine is permissible, it is desirable, as has been mentioned to have a small amount present to insure that all the toluic acid is in the form of diethylammonium toluate. A minimum of about 0.5% amine based on the crude amide will accomplish this objective. Based on the amount of amide per se in the crude material, the preceding values for amine content will correspond approximately to 8%, 5% and 0.4%, respectively, by weight.

As shown by the examples, the water extraction may be carried out either batchwise or continuously. The ratio of the crude amide to the amount of water may be varied from about 1:2 to about 5:1 on a weight basis. The amount of water is not critical, but is such that substantially complete extraction of the diethylammonium toluate will be effected and, at the same time, there will be adequate separation of aqueous and organic phases. It has been found that under these conditions the resulting organic phase will contain substantially all of the diethyltoluamide and about one-half of the diethylamine originally in the crude amide fed to the extraction, and the aqueous phase will contain the other half of the diethylamine and substantially all of the diethylammonium toluate. It is desirable to have an organic solvent present during the extraction. The examples have shown the use of benzene and toluene, but other liquid aromatic hydrocarbons such as ethyl benzene, the xylenes, propyl benzenes and butyl benzenes may be used. Toluene is preferred due to its ease of separation from mixtures with diethylamine and diethylamine plus water. The extraction may be carried out at any convenient temperature as long as phase separation will occur. Temperature apparently has no particular effect on the rate or extent of distribution of the various components of the crude amide between the aqueous and organic phases, and it may be varied between about 5° and about 65° C. with satisfactory results being obtained.

Subsequent to the extraction process of this invention, the aqueous phase containing diethylammonium toluate may be processed to recover separately the diethylamine and toluic acid components thereof. However, another advantage of the present process is the fact that the extracted diethylammonium toluate may be recycled as such to the amidation reaction after removal of water from the aqueous phase resulting from the extraction. No further consumption of chemicals is needed. The organic phase which contains the desired diethyltoluamide product is subjected to distillation to remove the small amounts of water and diethylamine usually present and the solvent which is preferably used during the extraction process, and then to recover the amide. This distillation is desirably carried out in a manner whereby color and odor forming impurities are removed. A preferable procedure is that described and claimed in the co-pending application of Frederick E. Williams, Serial No. 700,942, filed December 6, 1957. The process thereof is one of fractional distillation involving closely controlled temperature conditions in the reboiler and in the primary condenser and the passage of steam continuously through the distillation column during the distillation operation. The reboiler temperature during distillation is in the range of 180° to 225° C., and the overhead vapors from the column are passed through a primary condenser so operated that the temperature of the cooling liquid leaving the condenser is in the range of 75° to 110° C. This effects condensation of the major portion of the amide in the vapors, and the remaining vapors are then passed through a series of recovery units.

What I claim and desire to protect by Letters Patent is:

1. The process of recovering N,N-diethyltoluamide from the hot vaporous mixture of products produced in the vapor phase reaction between toluic acid and diethylamine at 250–350° C., said vaporous mixture containing N,N-diethyltoluamide, toluic acid, and diethylamine when hot, which comprises cooling said mixture to a temperature which will condense the amide but permit the diethylamine to remain as a vapor whereby a condensate of all of the N,N-diethyltoluamide and unreacted toluic acid and part of the diethylamine combined with the toluic acid as a salt thereof is formed, separating the vaporous diethylamine which is not so combined and condensed, contacting the condensate with water in amount sufficient to form an aqueous phase containing the toluic acid and diethylamine as diethylammonium toluate and an organic phase containing N,N-diethyltoluamide and recovering N,N-diethyltoluamide by distillation of the organic phase.

2. The process of claim 1 wherein benzene is added as solvent to the condensed crude amide prior to the water extraction operation.

3. The process of claim 1 wherein toluene is added as solvent to the condensed crude amide prior to the water extraction operation.

4. The process of claim 1 wherein the water extraction is carried out continuously.

5. The process of claim 4 wherein toluene is added as solvent during the extraction.

6. The process of claim 1 wherein the toluic acid is m-toluic acid.

7. The process of claim 1 wherein the toluic acid is a mixture of m- and p-toluic acids in a ratio above 80:20.

References Cited in the file of this patent

Beilsteins Handbuch der Organischen Chemie, vol. 9, second supplement (1949), p. 325.

Degering: Outline of Organic Nitrogen Compounds (1950), p. 400.

Chemistry of Organic Compounds (Noller), published by W. B. Saunders Company (Philadelphia) (1951), p. 238.

Handbook of Chemistry and Physics (35th ed.), published by Chemical Rubber Publishing Co. (Cleveland) (1953), pp. 1172–1173.

Inorganic Chemistry (Moeller), published by John Wiley and Sons, Inc. (N.Y.), 1955, p. 576.

The Systematic Identification of Organic Compounds (Shriner et al.), published by John Wiley and Sons, Inc., N.Y. (1956), p. 72.

UNITED STATES PATENT OFFICE
CERTIFICATE OF CORRECTION

Patent No. 2,995,604            August 8, 1961

William L. Phalen, Jr.

It is hereby certified that error appears in the above numbered patent requiring correction and that the said Letters Patent should read as corrected below.

Column 4, line 59, for "covered" read -- recovered --; column 5, line 9, for "as", second occurrence, read -- a --; column 8, line 4, for "80s20" read -- 80:20 --.

Signed and sealed this 19th day of December 1961.

(SEAL)
Attest:

ERNEST W. SWIDER           DAVID L. LADD
Attesting Officer           Commissioner of Patents
                                                            USCOMM-DC